A. SCHULZE.
OPTICAL PROJECTION SCREEN.
APPLICATION FILED JAN. 20, 1920.
1,381,022. Patented June 7, 1921.
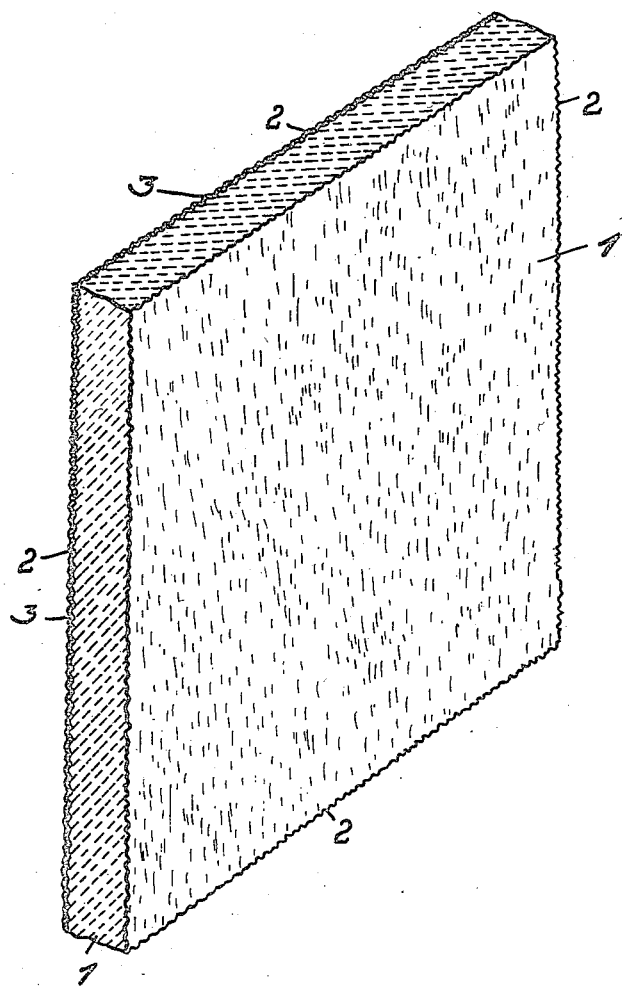

UNITED STATES PATENT OFFICE.

ARTHUR SCHULZE, OF BERLIN, GERMANY, ASSIGNOR OF ONE-HALF TO DEUTSCHE LICHTBILD-GESELLSCHAFT E. V., OF BERLIN, GERMANY.

OPTICAL PROJECTION-SCREEN.

1,381,022. Specification of Letters Patent. Patented June 7, 1921.

Application filed January 20, 1920. Serial No. 352,849.

*To all whom it may concern:*

Be it known that I, ARTHUR SCHULZE, a citizen of Germany, residing at Berlin, Germany, have invented certain new and useful Improvements in Optical Projection-Screens, of which the following is a specification.

A known kind of optical projection screen which enables stationary or moving pictures to be displayed in a light room by lighted rays sent through the screen consists of a plate of colored or uncolored glass or the like that is made dull or frosted on the surface turned toward the observer. Another proposed means for weakening the disturbing effect of the light in the undarkened theater that strikes the screen and illumines the dark parts of the projected picture by its being reflected by the frosted surface consists in placing a layer of material that absorbs the light before the plate of the screen. Of course the material that absorbs the light shining upon it from the room where the spectators sit also absorbs the light emanating from the projecting lantern in the same measure.

The object of this invention is on the one hand to reduce the absorption of the light to the greatest possible extent in order to enable the light of the projecting lantern to be utilized as fully as possible, and on the other hand to cause the screen to appear quite dark so long as it is illumined by light from the spectators' side only, in spite of the fact that the absorbing effect is dispensed with to the greatest possible degree.

This is accomplished by roughening the screen—which may be made of glass, cellon or the like—not on one side only, but on both sides or surfaces, as for example by means of a sand-blast, and by applying an oily or fatty substance such as petroleum jelly to both surfaces or only to the surface that is turned toward the spectators.

The layer of grease or oil remains effective for a long time, sometimes for years. A screen of this description appears almost black as long as it is only illumined from the spectators' side, but this is not because all of the light beams are weakened as formerly by absorption with the aid of layers of colloidal solutions of platinum or the like, but on account of the fact that practically all of the light can pass through the plate and is admitted into the closed camera whose interior is blackened and which is situated between the screen and the objective of the projecting apparatus. On the light passing through the plate, no matter whether it passes in the one direction or the other, it is sufficiently diffused by reason of the roughened surface on either side.

Although the material of which the screen is made is transparent it need not be colorless but may be of a darkish tint.

The invention is illustrated in the drawing in which a section through a fragment of the screen is shown on an enlarged scale.

The transparent sheet 1, which may be made of glass or of a suitable flexible material such as cellon, may be colorless, or a darkish tint may be imparted to it by fine particles of a coloring agency evenly distributed in said material, so that objects seen through it, while appearing perfectly clear and distinct, seem to have a darkish hue. The two surfaces 2 of the sheet are roughened, the roughness being greatly magnified in the drawing for convenience of illustration. A layer 3 of fatty or oily substance is spread over one or both surfaces of the screen.

I claim:

1. An optical projection screen consisting of a transparent sheet with both surfaces roughened and a layer of fatty substance upon the one of the said surfaces that is turned toward the spectators, whereby a dark aspect of the screen is produced while its transparency is increased.

2. An optical projection screen consisting of a sheet of transparent material with both surfaces roughened and a layer of fatty substance upon each of the said surfaces, whereby a dark aspect of the screen is produced while its transparency is increased.

3. An optical projection screen consisting of a sheet of transparent material of a darkish tint with both surfaces roughened, and a layer of fatty substance upon each of the said surfaces, whereby a dark aspect of the screen is produced while its transparency is increased.

In testimony whereof I have signed this specification in the presence of two witnesses.

ARTHUR SCHULZE.

Witnesses:
ADOLF LEORCLE,
L. REICH.